United States Patent [19]

Kindgren et al.

[11] 3,852,649

[45] Dec. 3, 1974

[54] MATERIAL HANDLING APPARATUS WITH CARRIAGE DRIVE MEANS

[75] Inventors: Lee Kindgren, Rockford; William B. Scott, Steward, both of Ill.

[73] Assignee: W. A. Whitney, Corporation, Rockford, Ill.

[22] Filed: Nov. 7, 1973

[21] Appl. No.: 413,501

[52] U.S. Cl. ............................... 318/257, 318/228
[51] Int. Cl. ............................................. H02p 7/40
[58] Field of Search ........... 318/228, 229, 256, 257, 318/264, 265, 266, 267

[56] References Cited
UNITED STATES PATENTS

| | | | |
|---|---|---|---|
| 2,118,219 | 5/1938 | Mellon | 318/228 X |
| 2,395,562 | 2/1946 | Mansell | 318/265 X |
| 2,837,975 | 6/1958 | Johnson | 318/266 X |

Primary Examiner—Robert K. Schaefer
Assistant Examiner—W. E. Duncanson, Jr.
Attorney, Agent, or Firm—Wolfe, Hubbard, Leydig, Voit & Osann, Ltd.

[57] ABSTRACT

A carriage is movable along a roller conveyor and supports a gaging probe for detecting the position of a beam adapted to be advanced by the conveyor. The carriage is driven by an a.c. induction motor which is uniquely controlled to keep the probe pressed into engagement with the end of the beam at all times while avoiding burning out of the motor when the beam is stopped and the motor is stalled.

6 Claims, 5 Drawing Figures

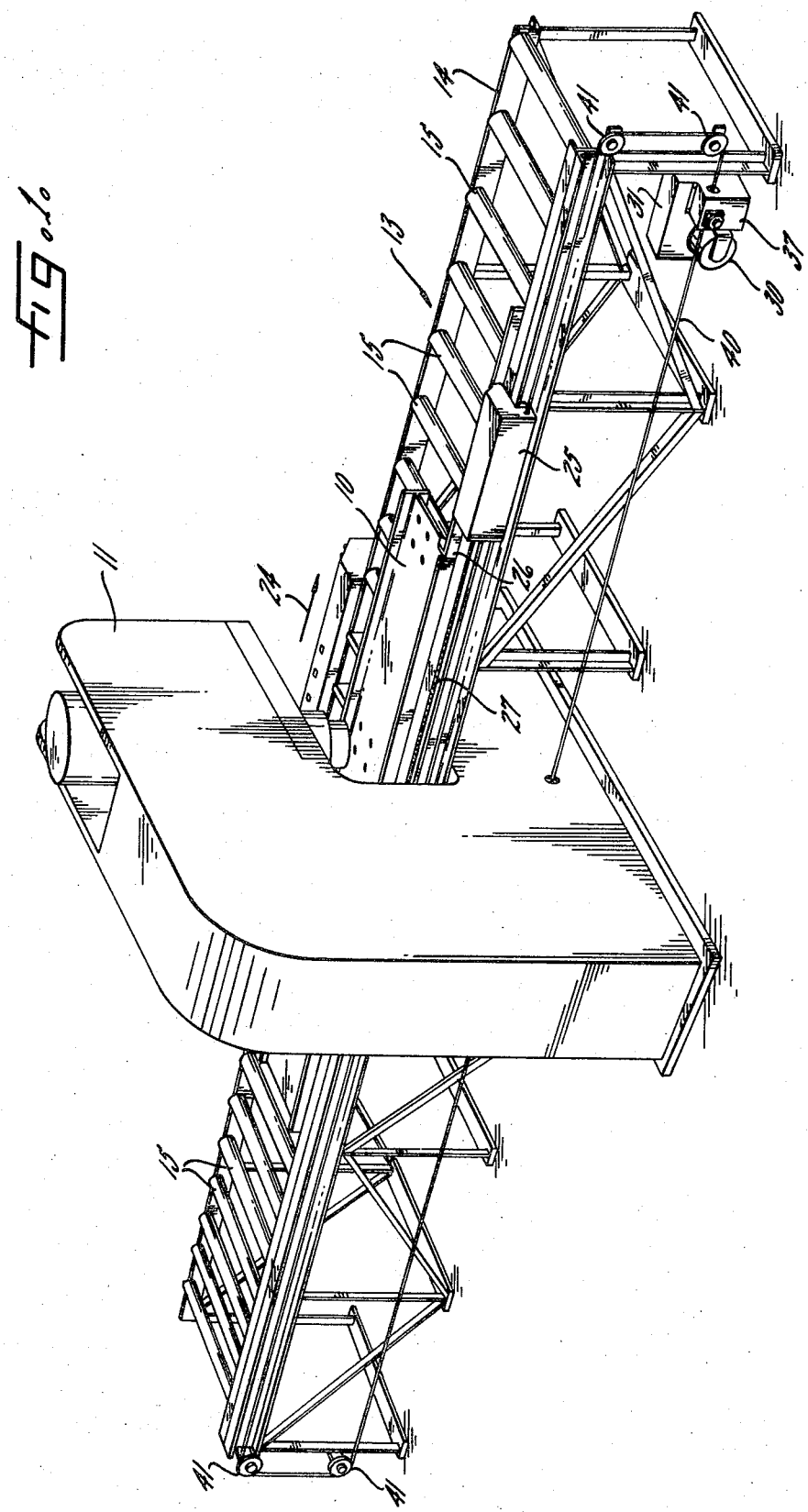

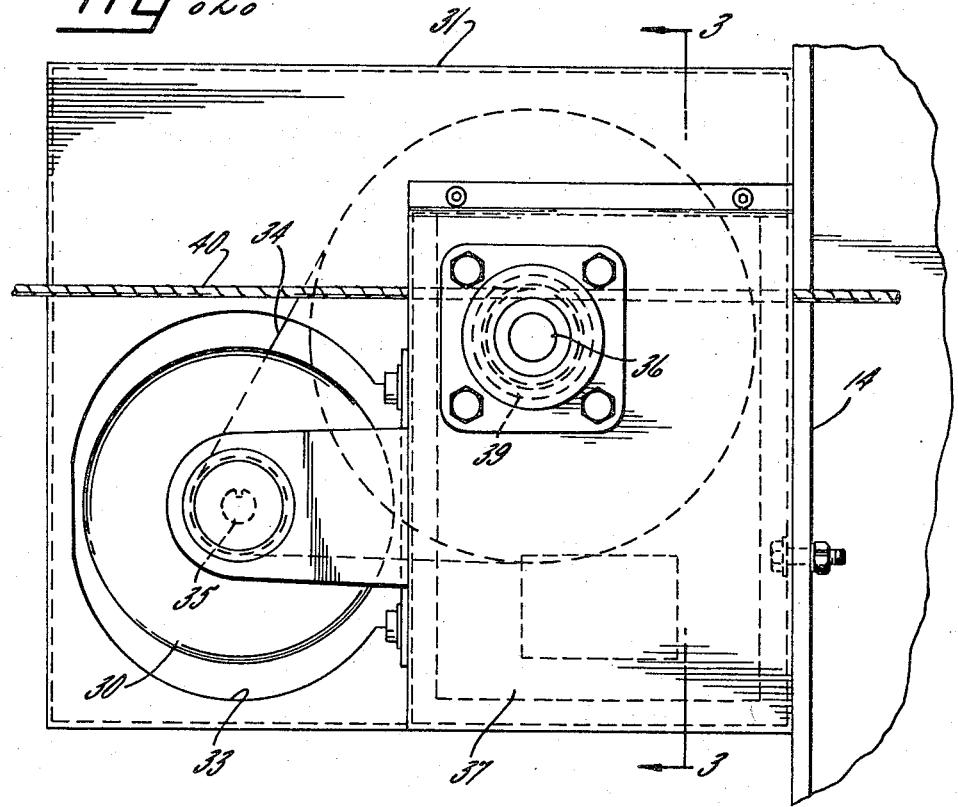
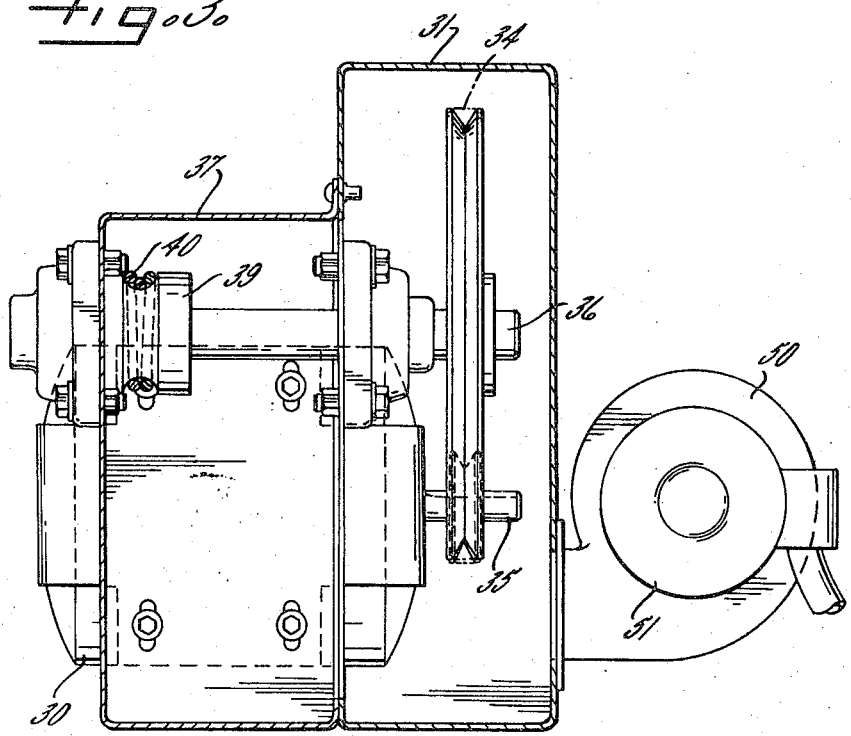

MATERIAL HANDLING APPARATUS WITH CARRIAGE DRIVE MEANS

BACKGROUND OF THE INVENTION

This invention relates to material handling apparatus having a conveyor for moving a member along a linear path and, more particularly, to apparatus in which a gaging element is associated with the conveyor and engages the forward end of the member to enable measurement of the distance between the forward end and a reference point. In apparatus of this type, it is conventional to mount the gaging element on a carriage which is movable forwardly and rearwardly relative to the conveyor.

SUMMARY OF THE INVENTION

The general aim of the present invention is to provide relatively simple and inexpensive means for driving the gaging element carriage and operable to keep the gaging element pressed against the end of the member at all times, i.e., when the member is being moved forwardly and rearwardly by the conveyor and when the member is stopped on the conveyor.

A more detailed object is to achieve the foregoing by driving the gaging element carriage with a comparatively low cost a.c. induction motor and by uniquely controlling the voltage supply to the motor to avoid burning out the motor even when the latter is stalled with the gaging element pressed against the stopped member.

A further object is to apply a forward voltage bias to the motor when the member is being conveyed forwardly so as to enable the member to push the carriage forwardly with less force.

Still another object is to control the voltage supply to the carriage motor with the same control means used to start, stop and reverse the conveyor.

These and other objects and advantages of the invention will become more apparent from the following detailed description when taken in conjunction with the accompanying drawings.

BRIEF DESCRIPTION OF THE DRAWINGS

FIG. 1 is a rear perspective view of an exemplary conveyor and gaging element carriage equipped with a new and improved carriage drive embodying the novel features of the present invention.

FIG. 2 is an enlarged rear elevational view of parts shown in FIG. 1.

FIG. 3 is a cross-section taken substantially along the line 3—3 of FIG. 1.

DETAILED DESCRIPTION OF THE PREFERRED EMBODIMENT

Figure 4:
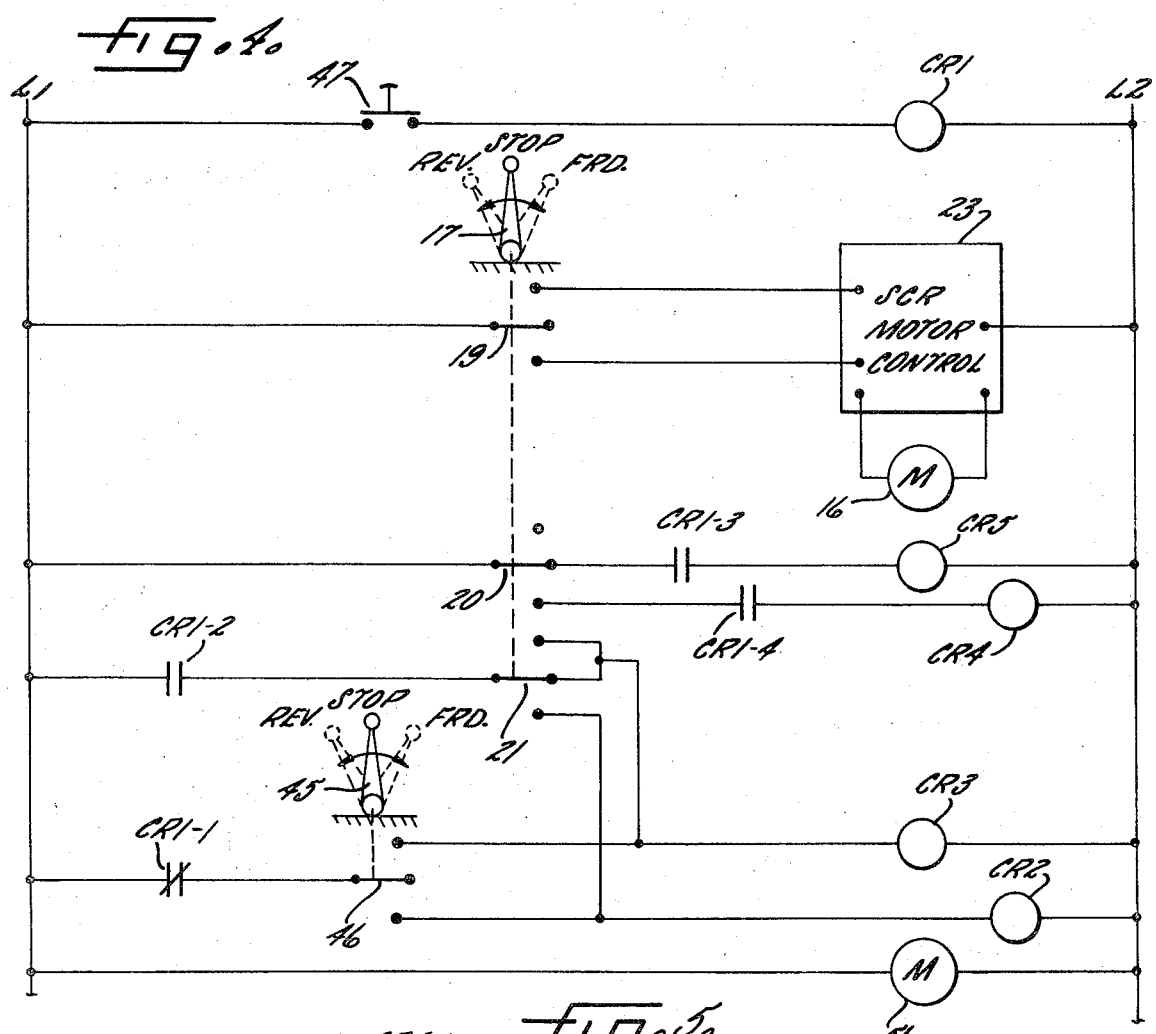
FIG. 4 is a diagram of a circuit for controlling the conveyor and the carriage drive motor.

As shown in the drawings for purposes of illustration, the invention is embodied in a material handling apparatus for moving an elongated structural member such as an I-beam 10 along a linear path to an operating station where a metal working operation may be performed on the beam. In this instance, a punch press 11 is shown as being located in the operating station and is operable to punch a hole in the beam when the latter is stopped.

The material handling apparatus includes a roller conveyor 13 of conventional construction and comprising a frame 14 which journals a series of horizontally extending rollers 15 for supporting the beam 10. The latter are interconnected by a drive chain (not shown) which is connected to a reversible d.c. drive motor 16 (FIG. 4) operable to rotate the rollers in forward or reverse directions. To control energization of the motor, provision is made of a joystick-type control handle 17 (FIG. 4) adapted to be pivoted in opposite directions from a stop position to either a forward position or a reverse position. Three ganged switch wipers 19, 20 and 21 are connected to the control handle and each is adapted to move between down, centered and up positions when the handle is moved between its forward, stop and reverse positions, respectively. When the handle is in its stop position shown in solid lines in FIG. 4, the conveyor motor 16 is de-energized. When the handle is pivoted to its forward or reverse positions, voltage from supply lines $L_1$ and $L_2$ is applied by way of the switch wiper 19 to the forward or reverse terminals, respectively, of an S.C.R. motor controller 23 which causes the motor to drive the conveyor rollers 15 forwardly or rearwardly, the forward direction being indicated by the arrow 24 shown in FIG. 1. A variable speed control (not shown) is associated with the SCR controller and may be adjusted to cause movement of the beam at a rate as high as 80 feet per minute.

To facilitate the punching of holes at given locations along the beam 10, means are provided for measuring the distance between the forward end of the beam and the punch of the press 11. Herein, these means comprise a carriage 25 (FIG. 1) located ahead of the forward end of the beam and suitably supported and guided on the conveyor frame 14 to move forwardly and rearwardly relative to the frame. A gaging element or probe 26 projects laterally from the carriage and contacts the forward end of the beam so that the position of the carriage along the conveyor 13 is indicative of the position of the beam. In this instance, a long measuring tape 27 is attached at one end to the carriage and is adapted to be pulled from a supply drum (not shown) and drawn past a fixed reference point on the conveyor as the carriage moves forwardly, the tape being taken up automatically on the drum as the carriage moves rearwardly. By reading the tape at the reference point, the punch press operator can determine the distance between the press and the end of the beam and can control the conveyor so as to locate the beam for punching of a hole in the proper position along the length of the beam. Instead of the tape, other means may be used to determine the position of the carriage, and thus the beam, along the conveyor. For example, the carriage may be equipped with an encoder adapted to produce digital signals as the carriage moves along the conveyor, such signals being used to activate a digital display device for indicating the position of the beam.

In order to provide accurate measurements, it is necessary that the gaging probe 26 remain in contact with the forward end of the beam 10 at all times. In other words, the probe should engage the beam when the latter is being moved forwardly or rearwardly and when the beam is stopped. As the beam is advanced forwardly, its forward end engages the probe and pushes the carriage 25 forwardly along the conveyor 13. When the beam is being moved rearwardly, it is necessary to drive the carriage reversely in order to keep the probe in engagement with the beam.

According to the present invention, a reversible a.c. induction motor 30 is used to drive the probe carriage 25 rearwardly along the conveyor 13, and the voltage supply to the motor is controlled in a unique manner to insure that the probe 26 is kept in intimate contact with the beam 10 at all times but without danger of overheating and burning out the motor when the beam is stopped. Moreover, the motor 30 applies a forward bias to the carriage when the beam is being advanced forwardly and thus the beam need not push the carriage with such a large force as would be the case in the absence of the forward bias. As compared with prior arrangements for driving carriages similar to the carriage 25, the a.c. induction motor is simple and inexpensive and yet, at the same time, is reliable and trouble-free in service use.

More specifically, one exemplary a.c. induction motor 30 which may be used in carrying out the invention is a 230 volt-three phase, ¼ H.P./1,140 R.P.M. motor of the type sold by General Electric Company under model designation K42FG2542. The motor 30 is supported by a box-like metal housing 31 (FIGS. 1 to 3) attached to the back side of the conveyor frame 14 beneath the rollers 15. The inner end portion of the motor is located within the housing while the outer end portion of the motor projects through an enlarged hole 33 (FIG. 2) in the outer wall of the housing and is located outside of the housing. A speed reducing belt drive 34 connects the drive shaft 35 of the motor to a shaft 36 journaled between the outer wall of the housing and the outer wall of a second box-like housing 37 attached to the outer wall of the first housing alongside the outer end portion of the motor. Wrapped around a pulley 39 (FIG. 3) on the shaft 36 is a wire rope (e.g., a wire cable with a nylon sheath) whose ends are attached to opposite ends of the carriage 25, the rope being trained around four guide pulleys 41 (FIG. 1) on the back side of the conveyor frame 14. When the motor drive shaft 35 is turned forwardly and reversely, the rope 40 pulls the carriage 25 forwardly and reversely along the conveyor 13. With the motor shaft turning at 1,140 R.P.M., the carriage may be moved at a rate of about 104 feet per minute.

Figure 5:
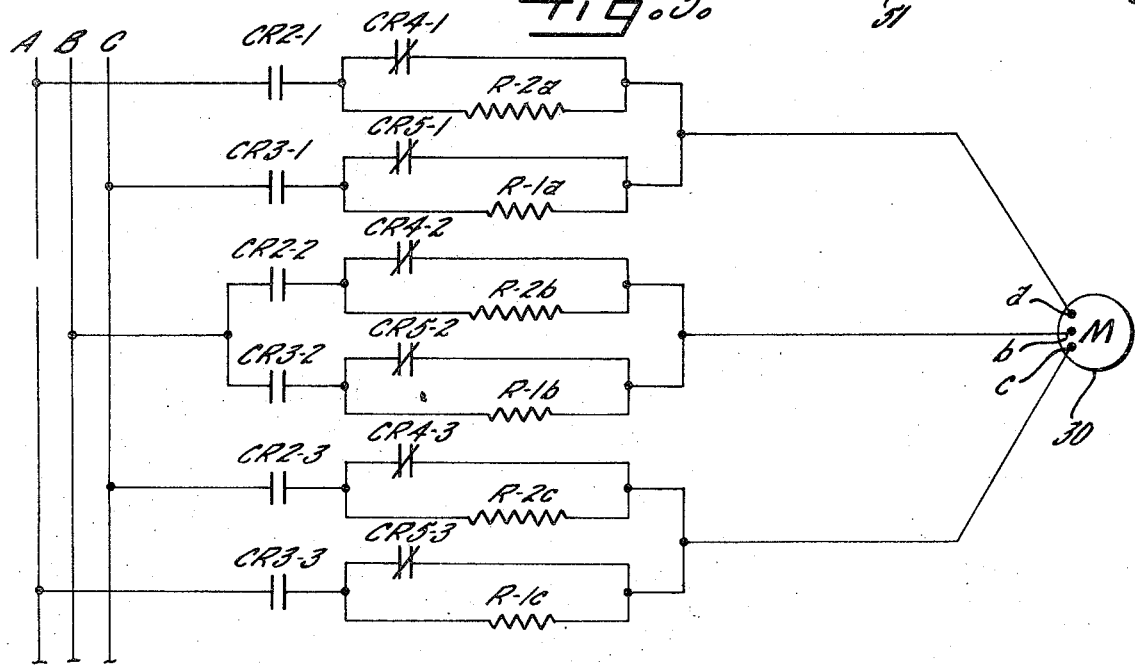
FIG. 5 is a diagram of a circuit for energizing the drive motor.

The carriage motor 30 is adapted to be energized by a three phase voltage source connected to power lines A, B and C (FIG. 5). In keeping with the invention and for a purpose to be described subsequently, the maximum voltage which is applied to the motor is appreciably less than the rated voltage (230 volts) of the motor and, in this particular instance, is 115 volts. Thus, the lines A, B and C are connected to a 115 volts a.c. three phase voltage source.

One of the important features of the invention is that the carriage motor 30 may be controlled by the control handle 17 for the conveyor 13 so that the carriage motor will be driven forwardly and reversely automatically as an incident to forward and reverse driving of the conveyor. The carriage motor may, however, be driven independently of the conveyor so as to enable the press operator to position the carriage 25 at will and particularly to return the carriage to a starting position after the operation on one beam 10 has been completed.

Independent control of the carriage motor 30 is effected by means of a second three-position joystick control handle 45 (FIG. 4) connected to a switch wiper 46. If the carriage is to be driven independently of the conveyor, a manual switch 47 is open as shown in FIG. 4, a relay CR1 is de-energized, and relay contacts CR1-1 are closed. When the control handle 45 is in its centered or stop position, the carriage motor 30 is de-energized. Upon pivoting of the handle 45 to its forward position, a relay CR2 is energized through relay contacts CR1-1 and switch wiper 46. Energization of relay CR2 causes closing of relay contacts CR2-1, CR2-2 and CR2-3 in the control circuit (FIG. 5) for the carriage motor 30. By way of these contacts and closed relay contacts CR4-1, CR4-2 and CR4-3, the motor input terminals a, b and c are supplied with full voltage (i.e., 115 volts) from the lines A, B and C, respectively, so as to drive the motor 30 in a forward direction and move the carriage 25 forwardly along the conveyor 13 at a rate of about 104 feet per minute.

When the control handle 45 (FIG. 4) is pivoted to its reverse position, relay CR3 is energized by way of relay contacts CR1-1 and the switch wiper 46. As a result, relay contacts CR3-1, CR3-2 and CR3-3 (FIG. 5) are closed and, by way of these contacts and closed relay contacts CR5-1, CR5-2 and CR5-3, the motor input terminals a, b and c are supplied with full voltage from the lines C, B and A, respectively. Accordingly, the motor 30 is driven in a reverse direction to move the carriage 25 reversely along the conveyor 13 at a rate of approximately 104 feet per minute.

To enable control of the carriage motor 30 with the control handle 17 for the conveyor motor 16, the press operator closes the manual switch 47 (FIG. 4) to energized relay CR1. As a result, relay contacts CR1-1 are opened to disable the control handle 45 and, at the same time, relay contacts CR1-2, CR1-3 and CR1-4 are closed. Now, if the control handle 17 is pivoted to its reverse position, the conveyor motor 16 is energized to drive the beam 10 in a reverse direction. In addition, relay CR3 is energized through relay contacts CR1-2 and switch wiper 21.

With relay CR3 energized, the carriage motor 30 is energized in the same manner as when the control handle 45 is in its reverse position and thus full voltage is applied to the motor terminals a, b, c in the phase sequence C, B, A. Accordingly, the carriage motor 30 moves the carriage 25 reversely when the beam 10 moves reversely and, in the absence of the beam, would move the carriage at a greater rate than the beam. Hence, the gaging probe 26 is kept in engagement with the end of the beam when the latter is present and is being moved rearwardly. Because the slower moving beam acts as a brake to retard movement of the carriage 25, the load which is imposed on the carriage motor 30 is greater than would be imposed if the beam were not present. The voltage supplied to the carriage motor, however, is only half the rated voltage of the motor and thus even though the motor draws greater current when retarded by the beam, such current is not sufficiently high to overheat and cause burning of the motor.

If the control handle 17 is moved from its reverse position to its stop position to stop the beam 10, the relay CR3 (FIG. 4) is kept energized through the switch wiper 21 and relay contacts CR1-2. In addition, relay CR5 is energized via switch wiper 20 and relay contacts CR1-3 so as to cause opening of relay contacts CR5-1, CR5-2 and CR5-3 (FIG. 5). As a result, the motor terminals a, b, c are still energized in the phase sequence C, B, A to cause reverse driving of the carriage motor 30 but the current cannot flow to the terminals in the paths containing open contacts CR5-1, CR5-2 and CR5-3. Instead, the current flows along parallel paths containing resistors R-1$_a$, R-1$_b$ and R-1$_c$ all having an equal resistance value. Accordingly, the voltage supplied to the carriage motor 30 is reduced and, in this particular instance, is reduced to a value of about 75 volts. Such voltage is sufficiently high to cause the carriage 25 to creep slowly in a reverse direction along the conveyor 13 if the beam 10 is absent. Thus, when the beam is present and is stopped on the conveyor, the carriage motor 30 keeps the gaging probe 26 pressed firmly against the forward end of the beam so that accurate measurements can be obtained. Since rearward movement of the carriage 25 is stopped by the beam, the carriage motor 30 is stalled and the stall may be of prolonged duration. By virtue of the reduced voltage, however, the current drawn by the carriage motor in the stalled condition is relatively low (on the order of 1.8 amps.) and is not so high as to cause overheating and burning out of the motor.

When the control handle 17 (FIG. 4) is pivoted to its forward position to cause forward driving of the conveyor 13, relay CR2 is energized by way of relay contacts CR1-2 and switch wiper 21 to effect closing of relay contacts CR2-1, CR2-2 and CR2-3 (FIG. 5). At the same time, relay CR4 (FIG. 4) is energized via switch wiper 20 and relay contacts CR1-4 and thus relay contacts CR4-1, CR4-2 and CR4-3 (FIG. 5) are opened. Accordingly, the motor terminals a, b, c are energized in the forward phase sequence A, B, C but, since the energizing paths containing the relay contacts CR4-1, CR4-2 and CR4-3 are open, the current flows to the motor via three parallel paths containing resistors R-2$_a$, R-2$_b$ and R-2$_c$. The resistance value of each of these resistors is equal and is greater than that of the resistors R-1. Thus, the carriage motor 30 is supplied with an even lower voltage (on the order of 60 volts) than is the case when the beam 10 is stopped. The lower voltage tends to drive the carriage motor 30 in a forward direction but is so low that the motor is not capable of moving the carriage 25. Hence, the carriage will not run away from the beam and will be pushed forwardly by engagement of the beam with the probe 26 when the beam is moved forwardly. By virtue of the forward voltage bias applied to the carriage motor 30, however, less pushing force is required to overcome the inertia and friction of the motor rotor, the speed reducer 34 and the rope 40 than would be the case if the motor were de-energized. As a result, the carriage can be pushed forwardly with a comparatively small force and thus even light weight beams, channels, and angles can push the carriage forwardly without need of being pressed downwardly against the conveyor rollers 15 by pinch rollers or the like.

From the foregoing, it will be apparent that the present invention brings to the art a new and improved carriage driving arrangement in which a relatively inexpensive a.c. induction motor 30 is used to drive the carriage 25 and is controlled in a novel manner so as to reduce the current drawn by the motor when the latter is stalled or heavily loaded during such time as the beam 10 is stopped or moving reversely. In addition, the motor is advantageously used to enable the beam to push the carriage forwardly with less force. By controlling the carriage motor 30 with the same control handle 17 used for controlling the conveyor motor 16, the tasks required of the press operator are simplified and yet the operator still has the option of controlling the carriage 25 independently of the conveyor 13 through use of the control handle 45.

As an extra safeguard against overheating of the carriage motor 30, it is desirable in certain instances to circulate cooling air through the motor. This is achieved in the present instance through the provision of a blower 50 (FIG. 3) mounted on the inner wall of the housing 31 and driven by a motor 51 which is adapted to be energized whenever voltage is supplied to the lines L$_1$ and L$_2$. The outlet of the blower is disposed in the housing 31 and serves to blow cooling air into the normal cooling vents of the motor 30.

We claim as our invention:

1. The combination of, a power-driven, reversible conveyor adapted to support an elongated structural member for movement in an endwise direction, control means selectively operable to advance, reverse and stop said conveyor and the supported member, a carriage movable forwardly and rearwardly along said conveyor and having an element engageable with the forward end of said member, a reversible a.c. induction motor for moving said carriage, and means responsive to said control means for supplying said motor with:

a. a first voltage for causing said carriage to move reversely when said member is moved reversely, said first voltage being of sufficient magnitude to cause said carriage, in the absence of said member, to move at a rate greater than the rate of said member thereby to keep said element in engagement with said member;

b. a second voltage for causing said carriage, in the absence of the member, to move reversely when said member is stopped, said second voltage being of lower magnitude than said first voltage so as to cause said element to remain pressed against the stopped member without said motor developing excessive heat; and c. a third voltage for causing said carriage to tend to move forwardly when said member is moved forwardly, the magnitude of said third voltage being insufficient to advance said carriage at a rate greater than the rate of said member whereby said element is held in engagement with said member while said motor reduces the force with which said member must push said carriage to move the latter forwardly.

2. The combination defined in claim 1 in which said third voltage is of lower magnitude than said second voltage and is not sufficiently high to cause said motor to advance said carriage forwardly when said element is not in engagement with and being pushed forwardly by said member.

3. The combination defined in claim 1 further including additional means for controlling said motor independently of said control means and selectively operable to de-energize said motor and to cause the motor to be supplied with voltages of sufficient magnitude to cause said carriage to move forwardly and reversely when said member is absent.

4. The combination defined in claim 1 in which said motor is a three phase motor and in which said first voltage is less than the rated voltage of said motor.

5. The combination of, a power-driven, reversible conveyor adapted to support a member for movement along a linear path, control means selectively operable to advance, reverse and stop said conveyor and the supported member, a carriage movable along said conveyor and having an element engageable with the forward end of said member, an a.c. induction motor for moving said carriage, and means operable to supply said motor with:

a a first voltage for causing said carriage to move reversely when said member is moved reversely, said first voltage being of sufficient magnitude to cause said carriage, in the absence of said member, to move at a rate greater than the rate of said member thereby to keep said element in engagement with said member; and b a second voltage for causing said carriage, in the absence of the member, to move reversely when said member is stopped, said second voltage being of lower magnitude than said first voltage so as to cause said element to remain pressed against the stopped member without said motor developing excess heat.

6. The combination defined in claim 5 in which said last-mentioned means are operable to supply said motor with a third voltage for causing said carriage to tend to move forwardly when said member is moved forwardly, the magnitude of said third voltage being insufficient to advance said carriage at a rate greater than the rate of said member whereby said element is held in engagement with said member while said motor reduces the force with which said member must push said carriage to move the latter forwardly.

* * * * *